United States Patent
Roehling et al.

(10) Patent No.: US 6,198,627 B1
(45) Date of Patent: Mar. 6, 2001

(54) NOISE REDUCTION BACK COVER FOR COMPUTER DEVICES

(75) Inventors: Donald P. Roehling, Eagle; Michael J. Anderson, Troy, both of ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/215,047

(22) Filed: Dec. 17, 1998

(51) Int. Cl.[7] .................................................. G06F 1/70
(52) U.S. Cl. ....................... 361/688; 361/686; 361/687; 361/690–691; 361/692; 361/693; 361/695
(58) Field of Search .................................. 361/687, 688, 361/690, 692, 694, 695

(56) References Cited

U.S. PATENT DOCUMENTS 5,526,228 * 6/1996 Dickson et al. ..................... 361/695

* cited by examiner

Primary Examiner—Leo P. Picard
Assistant Examiner—Yean-Hsi Chang

(57) ABSTRACT

A back cover assembly is provided for use in a device including a housing having a plurality of walls forming an enclosure. A blower mechanism is adapted to cause exhaust air to flow from an interior of the housing to an exterior of the housing. The back cover assembly is located in proximity with the blower mechanism, and includes an acoustical chamber adapted to permit exhaust air from the interior of the housing to pass therethrough. The acoustical chamber is adapted and constructed to reflect acoustical energy back into the blower mechanism. In an embodiment, at least one interior surface of the acoustical chamber is lined with a sound absorbing material such as polyurethane polyester foam. The acoustical chamber can include a front wall with at least one inlet open to blower mechanism, and a rear wall with at least one outlet. The outlet is in fluid communication with the at least one inlet on the front wall, and is open to the exterior of the housing. In order to provide the necessary acoustical reflectivity, the at least one inlet and the at least one outlet can be placed out of axial alignment with one another. For instance, where the at least one inlet is located at a top portion of the front wall, the at least one outlet may be located at a bottom portion of the rear wall. The at least one inlet and outlet can also be located at opposite sides of the chamber. Where there are a plurality of inlets and outlets, the plurality of inlets and outlets may be arranged to form respective inlet/outlet pairs. The acoustical chamber can be provided with at least one divider substantially spanning the space between the front and rear walls. The at least one dividers defines subchambers within the acoustical chamber, with each subchamber enclosing at least one inlet/outlet pair. The device with which the back cover assembly is associated may be provided as a disk array, such as a RAID system. Also disclosed is a method for reducing the amount of noise emitted by a device.

19 Claims, 2 Drawing Sheets

NOISE REDUCTION BACK COVER FOR COMPUTER DEVICES

FIELD OF THE INVENTION

This invention relates generally to the field of noise reduction in computer-related devices. More specifically, this invention relates to reducing the amount of noise emitted from the air exhaust outlets of computer-related devices.

BACKGROUND OF THE INVENTION

Noise pollution is a growing problem in society today. Everyday life presents myriad situations in which high levels of noise are the norm, for example, automobile traffic, factory workplaces, and busy shopping centers. Perhaps even more disconcerting is the fact that office environments, where relative quiet is essential to concentration, are becoming increasingly noisy.

Unfortunately, one of the major sources of increased office noise is also the source of progress and productivity: computer equipment. Personal computers, servers, and other common office computer equipment create noise and can be distracting. The single biggest sources of noise in these systems are fans. Fans are required for cooling heat-generating components such as disk drives, processors, and the power supplies. In general, the more powerful the device, the more heat energy it generates; hence, the more cooling it requires. It is an absolute must to provide sufficient cooling, otherwise the reliability of the device will suffer, and it may even break down altogether. Most fans provides a 'continuous' type of noise, although some low-quality fans also provide a fluctuating noise spectrum.

Yet another source of noise is the disk drive. Disk drives provide both a 'continuous' type of noise due to the rotation of the drive, and an 'impulse' type of noise created by data accesses.

These two sources of noise are combined most noticeably in multiple-disk devices, such as RAID systems. RAID is an acronym first described in a University of California at Berkeley paper written by Patterson, Gibson, and Katz, entitled "A Case for Redundant Arrays of Inexpensive Disks, or RAID," published in 1987. Over time, RAID has come to refer to "Redundant Arrays of Independent Disks."

Many different disk array configurations are possible, depending on end-user requirements and the goals of the manufacturer. Each controller design has a different functionality to accomplish specific performance and data availability goals. Some disk arrays offer protection against data loss due to a drive failure. Others provide increased disk connectivity per system by allowing the disk array to appear to the host system as a single large, logical device. For systems which are constrained on the total number of logical devices, the array offers a vehicle to increase total disk storage per system. RAID systems offer large amounts of storage in relatively small cabinets, resulting in more storage per unit of floor space. With high density, small form factor disk drives all sharing the same controller and power supply, an array offers substantial floor space savings over more conventional storage alternatives. Finally, although a major function of the disk array is to provide a large amount of storage at a high level of data availability, performance gains may also be realized for certain system applications through use of an intelligent controller managing the operation of several disk drives.

With their obvious advantages, disk arrays are becoming increasingly common in many office environments. This correspondingly increases the criticality of reducing the amount of cooling fan noise associated with such devices.

It is typical that users of computer-related devices have two contradictory demands: they want their equipment to be more powerful and quieter. However, greater power usually means more heat, and more heat means more cooling is required, which usually means a more powerful (and noisier) fan is needed. This dilemma has led to the development of several approaches to reducing cooling fan noise in other types of computer devices.

Of course, the most obvious and ideal solution would be to eliminate the cooling fan altogether. However, more powerful devices generate more heat and require more cooling. Unfortunately, no devices have appeared that can remove heated air as quickly and efficiently as fans. A corollary of fan elimination involves reducing power consumption. As a long term goal, some computer manufacturers are working towards producing devices that consume less power, and are optimizing the thermal design of their devices. While significant progress is being made in these areas, most devices still require a cooling fan.

Another approach is to design and use fans that produce less noise, or to use low-noise fans and fan speed control circuits. Unfortunately, higher-capacity fans are inherently noisier, and are often necessary in more powerful devices. Fan speed control units reduce the rotational speed of the fans when the ambient temperature is low, or when the device is operating under decreased loads. However, there are limits as to how much fans can be slowed down before affecting their reliability.

Another approach employs the use of alternative cooling techniques, for example, natural convection, heat ducts, and directed air flow. Natural convection allows air to circulate through holes in the device housing. This is currently a viable solution only for low-power devices which represent only a very small portion of the market. Heat ducts, or heat pipes, soak away heat from a particular component to a radiator. Directed air flow cools heat generating components more than other, cooler components in the device. Each of these cooling techniques allows a substantial reduction in noise, but cannot yet replace the power and efficiency of cooling fans.

While at present noise reduction is largely a function of consumer preference, governments and other regulatory bodies are beginning to recognize the need to set limits on office noise. For example, European Union has issued European Norm EN31690:1992 (ISO/DIS 11690) gives guidelines for the design of low-noise workplaces. It recommends a noise exposure limit of 55 dB(A) (Lp) for normal office work, and 45 dB(A) for conference rooms and mental work. The Swiss Caisse Nationale d'Assurance recommends the same value of maximum 55 dB(A) as EN31690. The Swedish Labor Union TCO also recommended a target value of less than 45 dB(A) in office environments.

In summary, the demand for ever more powerful computer devices has spawned a corresponding need to cool the devices that meet these demands. As more the capacity for cooling increases, so does the noise produced by known cooling devices, such as fans. Increased noise levels are not only undesirable from a consumer standpoint, but are more commonly becoming subject to regulatory scrutiny. Unfortunately, known modifications and alternatives to cooling fans have proven to be inadequate to reduce noise levels sufficiently.

It is apparent from the foregoing that the need exists for some method and apparatus that will reduce the amount of noise emanating from computer devices such as disk arrays while permitting the use of sufficiently powerful cooling fans.

SUMMARY OF THE INVENTION

In order to accomplish the present invention, there is provided a back cover assembly for use in a device including a housing having a plurality of walls forming an enclosure. A blower mechanism is adapted to cause exhaust air to flow from an interior of the housing to an exterior of the housing. The back cover assembly is located in proximity with the blower mechanism, and includes an acoustical chamber adapted to permit exhaust air from the interior of the housing to pass therethrough. The acoustical chamber is adapted and constructed to reflect acoustical energy back into the blower mechanism.

In an embodiment, at least one interior surface of the acoustical chamber is lined with a sound absorbing material such as polyurethane polyester foam. The acoustical chamber can have a generally parallelepipedal form with dimensions of approximately 14 cm×42 cm×2.54 cm.

The acoustical chamber can include a front wall with at least one inlet open to blower mechanism, and a rear wall with at least one outlet. The outlet is in fluid communication with the at least one inlet on the front wall, and is open to the exterior of the housing.

In order to provide the necessary acoustical reflectivity, the at least one inlet and the at least one outlet can be placed out of axial alignment with one another. For instance, where the at least one inlet is located at a top portion of the front wall, the at least one outlet may be located at a bottom portion of the rear wall. The at least one inlet and outlet can also be located at opposite sides of the chamber.

Where there are a plurality of inlets and outlets, the plurality of inlets and outlets may be arranged to form respective inlet/outlet pairs. The acoustical chamber can be provided with at least one divider substantially spanning the space between the front and rear walls. The at least one dividers defines subchambers within the acoustical chamber, with each subchamber enclosing at least one inlet/outlet pair. Each of the respective inlets and outlets can be generally rectangular in cross-section and have dimensions of approximately 6 cm×7 cm. The subchambers can be approximately 13 cm to 15 cm wide. The device with which the back cover assembly is associated may be provided as a disk array.

The present invention may find particular utility in a disk array including a housing having a plurality of walls forming an enclosure. The enclosure defines an interior and an exterior, and a plurality of information storage disks and associated drives are disposed on the interior of the housing. A centrifugal blower mechanism is provided to draw relatively cool fresh air into, and remove heated exhaust air from, the interior of the housing. A back cover assembly forms a part of the housing and includes an acoustical chamber. The back cover assembly is located in proximity with the centrifugal blower mechanism such that the exhaust air from the blower mechanism is directed through the acoustical chamber. The acoustical chamber is adapted and constructed to reflect acoustical energy back into the centrifugal blower mechanism.

In this embodiment, the acoustical chamber of the back cover assembly includes respective front, rear, side, top, and bottom walls. At least one inlet is disposed on the front wall and is open to the centrifugal blower mechanism. At least one outlet is disposed on the rear wall, and is in fluid communication with the at least one inlet on the front wall and open to the exterior of the housing. The side, top, and bottom walls of the acoustical chamber can be lined with a sound absorbing polyurethane polyester a foam.

Also disclosed is a method for reducing the amount of noise emitted by a device. The device includes a housing having a plurality of walls forming an enclosure, and a blower mechanism adapted to cause exhaust air to flow from the interior of the housing to the exterior of the housing. A back cover assembly is provided in proximity with the blower mechanism. In the first step, an acoustical chamber is provided on the back cover assembly. The acoustical chamber is adapted and constructed to reflect acoustical energy back into the blower mechanism during operation of the device. In the next step, the device is actuated to cause exhaust air from the blower mechanism to pass through the acoustical chamber.

BRIEF DESCRIPTION OF THE DRAWINGS

A better understanding of the invention may be had from the consideration of the following detailed description taken in conjunction with the accompanying drawings, in which.

DETAILED DESCRIPTION OF THE INVENTION

Figure 1:
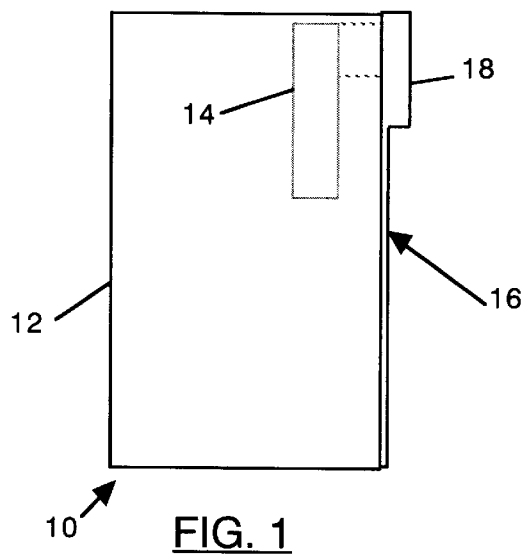
FIG. 1 is schematic view of a disk array embodying the principals of the present invention.
Figure 2:
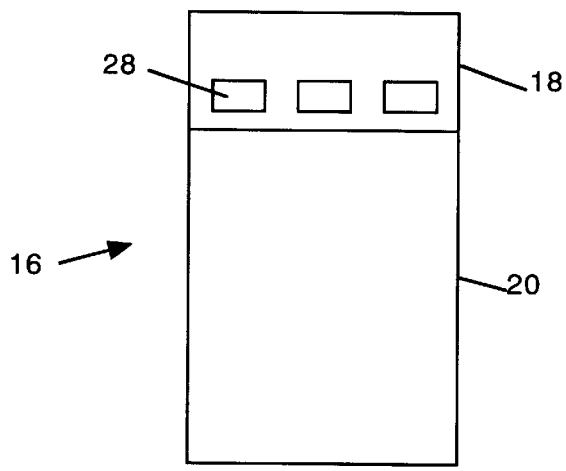
FIG. 2 is an elevational view of a back cover.
Figure 3:
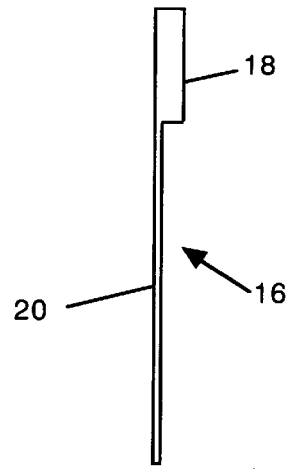
FIG. 3 is a side view of a back cover.

The present invention is not limited to a specific embodiment illustrated herein. FIG. 1 illustrates a device 10 including a housing 12 having a plurality of walls forming an enclosure. The device 10 may be provided as any device having an enclosure requiring cooling. The present invention finds particular utility in association with computer devices such as disk enclosures, e.g. JBOD and disk arrays. A specific device to which the invention may be effectively applied is an Model 12H disk array available from Hewlett-Packard Corp. The enclosure defines an interior and an exterior, and a plurality of information storage disks and associated drives (not shown) are disposed on the interior of the housing. An air motive mechanism 14 is provided to draw relatively cool fresh air into, and remove heated exhaust air from, the interior of the housing 12. The air motive mechanism 14 may be provided as a centrifugal blower mechanism, such as a scroll or squirrel cage fan.

A back cover assembly 16 forms a part of the housing 12, and (as seen in FIGS. 2–5) includes an acoustical chamber 18. The back cover assembly 16 is located in proximity with the air motive mechanism 14 such that the exhaust air from the blower mechanism 14 is directed through the acoustical chamber 18.

The location of the acoustical chamber 18 is dictated in part by the location of the outlet of air motive mechanism 14 within the housing 12. In the illustrated embodiment, the acoustical chamber 18 is located at an upper portion of the back cover 16, above a generally planar cover portion 20.

Figure 4:
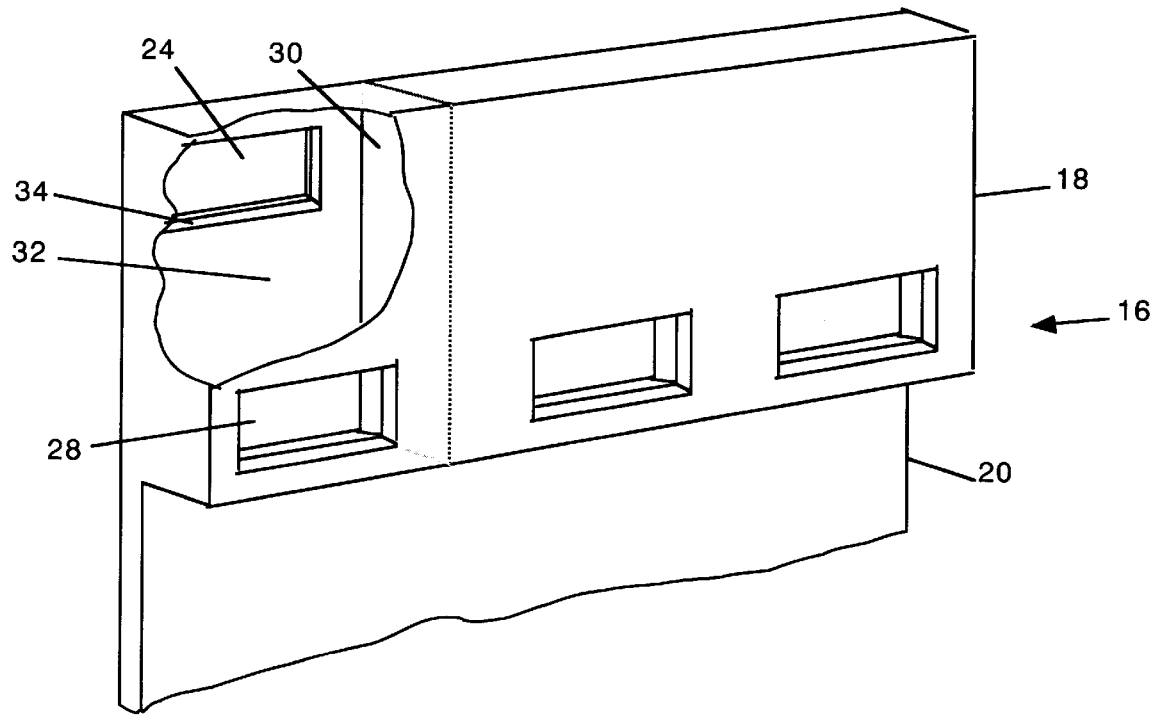
FIG. 4 is a detailed perspective view, partially broken away, showing the construction of an acoustical chamber in accordance with the principals of the present invention.
Figure 5:
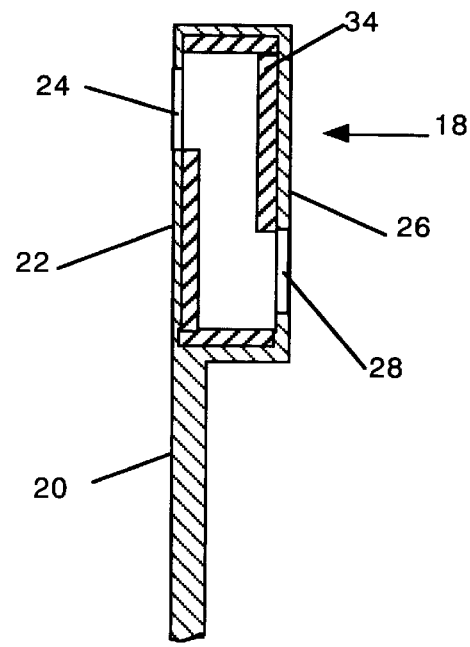
FIG. 5 is a sectional view taken along lines V—V FIG. 2.

As shown in FIGS. 4 and 5, the acoustical chamber 18 includes a front wall 22 with at least one inlet 24 open to the air motive mechanism 14. The acoustical chamber 18 also includes a rear wall 26 with at least one outlet 28. The outlet 28 is in fluid communication with the at least one inlet 24 on the front wall 22, and is open to the exterior of the housing 12.

In order to provide the necessary acoustical reflectivity, the at least one inlet 24 and the at least one outlet 28 can be placed out of axial alignment with one another. For instance, where the at least one inlet 24 is located at a top portion of the front wall 22, the at least one outlet 28 may be located at a bottom portion of the rear wall 26. The at least one inlet 24 and outlet 28 can also be located at opposite sides of the chamber 18.

The illustrated embodiment shows an acoustical chamber 18 including a plurality of inlets 24 and outlets 28 arranged to form respective inlet/outlet pairs. The acoustical chamber 18 is provided with a series of dividers 30 substantially spanning the space between the front wall 22 and the rear wall 26. The dividers 30 define subchambers 32 within the acoustical chamber 18, with each subchamber 32 enclosing at least one inlet/outlet pair. The division of the acoustical chamber 18 may be affected for a variety of reasons. For example, if the device 10 employs three separate cooling fans, the acoustical chamber 18 can be divided into three subchambers, each of which receives exhaust air from a respective fan.

The interior of the chamber 18 can be lined with a sound absorbing material 34, such as a sound absorbing foam. One example of a suitable sound absorbing material is PYRELL$_¿$, a polyester polyurethane foam material manufactured by the Silicone Products Division of General Electric and by Foamex International, Inc., a division of Trace International.

It is to be understood that the present invention is adaptable to any variety of sizes and configurations. It has been found that acoustical reflectivity tends to increase as the depth of the chamber increases. This effect is limited by a number of practical concerns that will be apparent to those of skill in the art, among which are the available space and footprint of the housing. One configuration that has been demonstrated to be effective employs an acoustical chamber having a generally parallelepipedal form with dimensions of approximately 14 cm×42 cm×2.54 cm. In this configuration, each of the respective inlets and outlets are generally rectangular in cross-section and have dimensions of approximately 6 cm×7 cm. The subchambers are approximately 13 cm to 15 cm wide.

The invention functions as follows. When the device 10 is in operation, the air motive mechanism 14 is actuated to cause exhaust air to flow from the interior of the housing 12 to the exterior of the housing 12. The exhaust air enters into the acoustical chamber 18 through the inlets 24, passes through the interior of the acoustical chamber 18, and exits through the outlets 28. Meanwhile, a major portion of the acoustical energy generated in the housing 12 during operation of the device 10 enters into the inlet 24, but cannot pass through the acoustical chamber 18, and is instead reflected back into the air motive mechanism 14. The sound absorbing material 34 assists in preventing acoustical energy from exiting through the outlets 28. Thus, the amount of noise emitted by the device 10 is significantly reduced. In fact, tests have shown a reduction in linear sound power of 20% to 50%, which corresponds to a reduction of approximately 1 dB to 3 dB.

Although the preferred embodiment of the present invention has been illustrated, and that form described, it is readily apparent to those skilled in the art that various modifications may be made therein without departing from the spirit of the invention, or form the scope of the appended claims.

What is claimed is:

1. In a device including a housing having a plurality of walls forming an enclosure and a blower mechanism adapted to cause exhaust air to flow from an interior of the housing to an exterior of the housing, a back cover assembly in proximity with the blower mechanism, the back cover assembly comprising the following:

an acoustical chamber adapted to permit exhaust air from the interior of the housing to pass therethrough to a plurality of outlet ports, the acoustical chamber having a rear wall being adapted and constructed to reflect a major portion of the acoustical energy generated in the housing back into the blower mechanism, at least one divider disposed interior of the acoustical chamber and substantially spanning the space between the housing and rear wall, whereby the dividers define subchambers within the acoustical chamber wherein each subchamber directing a portion of the exhaust air to an outlet port of said plurality of outlet ports.

2. A back cover assembly in accordance with claim 1, wherein at least one interior surface of the acoustical chamber is lined with a sound absorbing material.

3. A back cover assembly in accordance with claim 2, wherein the at least one interior surface of the acoustical chamber is lined with a sound absorbing synthetic foam.

4. A back cover assembly in accordance with claim 3, wherein the at least one interior surface of the acoustical chamber is lined with a polyurethane polyester foam.

5. A back cover assembly in accordance with claim 1, wherein the acoustical chamber is generally parallelepipedal.

6. A back cover assembly in accordance with claim 5, wherein the acoustical chamber has dimensions of approximately 14 cm×42 cm×2.54 cm.

7. A back cover assembly in accordance with claim 5, wherein the acoustical chamber comprises the following:

a front wall with at least one inlet open to blower mechanism; and a rear wall with at least one outlet, the outlet being in fluid communication with the at least one inlet on the front wall and open to the exterior of the housing.

8. A back cover assembly in accordance with claim 7, wherein the at least one inlet and the at least one outlet are out of axial alignment with one another.

9. A back cover assembly in accordance with claim 8, wherein the at least one inlet is located at a top portion of the front wall, and the at least one outlet is located at a bottom portion of the rear wall.

10. A back cover assembly in accordance with claim 9, wherein the front and rear walls have respective corresponding sides, and the at least one inlet is located on a side of the front wall opposite the side of the rear wall upon which the at least one outlet is located.

11. A back cover assembly in accordance with claim 7, wherein the at least one inlet comprises a plurality of inlets, and the at least one outlet comprises a plurality of outlets.

12. A back cover assembly in accordance with claim 10, wherein the plurality of inlets and outlets form respective inlet/outlet pairs.

13. A back cover assembly in accordance with claim 11, wherein each of the respective inlets and outlets is generally rectangular in cross-section and has dimensions of approximately 6 cm×7 cm.

14. A back cover assembly in accordance with claim 11, wherein the each of the subchambers is approximately 13 cm to 15 cm wide.

15. A back cover assembly in accordance with claim 1, wherein the device with which the back cover assembly is associated is a disk array.

16. A disk array comprising the following a housing having a plurality of walls forming an enclosure having an interior and an exterior;

a plurality of information storage disks and associated drives disposed on the interior of the housing;

a centrifugal blower mechanism adapted to draw relatively cool fresh air into, and remove heated exhaust air from, the interior of the housing; and a back cover assembly forming a part of the housing and including an acoustical chamber, at least one divider disposed interior of the acoustical chamber and substantially spanning the space between the housing and a rear wall of the housing, whereby the dividers define subchambers within the acoustical chamber, the back cover assembly being located in proximity with the centrifugal blower mechanism such that the exhaust air from the blower mechanism is directed through the subchambers of the acoustical chamber, the subchambers of the acoustical chamber being adapted and constructed to reflect a major portion of the acoustical energy generated in the housing back into the blower mechanism.

17. A disk array in accordance with claim 16, wherein the acoustical chamber of the back cover assembly comprises the following:

respective front, rear, side, top, and bottom walls;

at least one inlet disposed on the front wall and open to the centrifugal blower mechanism; and at least one outlet disposed on the rear wall, the outlet being in fluid communication with the at least one inlet on the front wall and open to the exterior of the housing.

18. A disk array in accordance with claim 17, wherein the side, top, and bottom walls of the acoustical chamber are lined with a sound absorbing polyurethane polyester a foam.

19. A method for reducing the amount of noise emitted by a device including a housing having a plurality of walls forming an enclosure having an interior and an exterior, the device further including a blower mechanism adapted to cause exhaust air to flow from the interior of the housing to the exterior of the housing, and a back cover assembly in proximity with the blower mechanism, the method comprising the following steps:

providing an acoustical chamber having a plurality of subchambers, on the back cover assembly, the each one of the plurality of subchambers in the acoustical chamber being adapted and constructed to reflect a major portion of the acoustical energy generated in the housing back into the blower mechanism during operation of the device; and actuating the device to cause exhaust air from the blower mechanism to pass through the plurality of subchambers of the acoustical chamber.

* * * * *